United States Patent
Brown, Jr. et al.

[11] Patent Number: 5,755,182
[45] Date of Patent: May 26, 1998

[54] LITTER BOX ASSEMBLY AND CLEANING METHOD

[75] Inventors: Michael A. Brown, Jr.; Timothy Charles Rothwell, both of Charlotte, N.C.

[73] Assignee: TC Industries, L.L.C., Charlotte, N.C.

[21] Appl. No.: 606,417

[22] Filed: Feb. 23, 1996

[51] Int. Cl.⁶ ........................................... A01K 1/01
[52] U.S. Cl. ............................... 119/166; 119/165
[58] Field of Search .......................... 119/166, 165, 119/162, 161

[56] References Cited

U.S. PATENT DOCUMENTS

| | | | |
|---|---|---|---|
| 3,100,474 | 8/1963 | Schneider | 119/166 |
| 4,325,325 | 4/1982 | Larter | 119/1 |
| 4,325,822 | 4/1982 | Miller | 209/251 |
| 4,505,226 | 3/1985 | Carlson | 119/1 |
| 4,602,593 | 7/1986 | Gross | 119/166 |
| 4,616,598 | 10/1986 | Burniski et al. | 119/1 |
| 4,696,257 | 9/1987 | Neary et al. | 119/166 |
| 4,817,560 | 4/1989 | Prince et al. | 119/1 |
| 4,970,987 | 11/1990 | Deyle | 119/166 |
| 5,032,254 | 7/1991 | Deboer et al. | 209/10 |
| 5,178,099 | 1/1993 | Lapps et al. | 119/166 |
| 5,181,480 | 1/1993 | Dabolt | 119/165 |
| 5,184,574 | 2/1993 | Kirk et al. | 119/162 |
| 5,207,772 | 5/1993 | Lauretta et al. | 119/167 |
| 5,211,133 | 5/1993 | Foley | 119/166 |
| 5,372,095 | 12/1994 | Dowling et al. | 119/166 |

FOREIGN PATENT DOCUMENTS

| | | | |
|---|---|---|---|
| 4200686 | 7/1993 | Germany | 119/166 |
| 94014315 | 7/1994 | WIPO | 119/161 |

*Primary Examiner*—Edgar S. Burr
*Assistant Examiner*—Anthony H. Nguyen
*Attorney, Agent, or Firm*—Kennedy Covington Lobdell & Hickman, L.L.P.

[57] ABSTRACT

An improved litter box assembly includes two litter boxes with one box nested within another. Each box has a floor with multiple openings and a plate disposed under the floor. Each plate is slidably attached to the floor of the respective box and also has multiple openings. The plate is slidable between a first position in which the openings in the floor and the openings in the plate correspond and a second position in which the openings in the floor are blocked by the plate. The boxes are identical and interchangeable. When nested, the boxes are reversed so that each plate, in sliding from the first position to the second position, slides in the opposite direction of the other plate in sliding from the first position to the second position. When the boxes are reversibly nested, a litter receiving space is created between the floors of the two boxes. In operation, when soiled litter in a upper box is to be removed, the plate of the upper box is moved from the first position to the second position. Unsoiled litter filters through the upper box into the bottom box, leaving soiled clumped litter in the upper box. The contents of the upper box can then be dumped. To reassemble the litter box assembly, the upper box is placed on the ground and the previously bottom box with the filtered litter is reversibly nested therein to become the upper box.

20 Claims, 7 Drawing Sheets

LITTER BOX ASSEMBLY AND CLEANING METHOD

BACKGROUND OF THE INVENTION

The present invention relates to pet litter boxes, and more particularly, to pet litter boxes having means adapted to assist in the cleaning thereof.

A number of diverse forms of pet litter boxes of the basic type described above have been proposed. For instance, U.S. Pat. No. 5,207,772 to Lauretta et al. discloses the use of multiple filter sheets in lining litter boxes for successive removal of pet waste by removing one-at-a-time each filter sheet. U.S. Pat. No. 4,505,226 to Carlson discloses the nesting of one box in another identical box with each box having a false bottom. In operation, the false bottom in the upper box of the assembly is carefully removed so as to shake off clean litter without dislodging clumped wet that sticks to the false bottom. Waste sticking to the false bottom can then be dumped in a suitable receptacle by shaking the false bottom over the receptacle. Dried clumped litter that falls off the false bottom is captured by the floor of the upper box, which has holes that allow clean litter to pass through to the bottom box but prevent the passage of soiled clumped litter therethrough. The upper box is then emptied over a suitable receptacle and the false bottom is reinstalled in the upper box. The bottom box with the unsoiled litter is then nested in the upper box to become the new upper box.

In U.S. Pat. No. 4,616,598 to Burniski et al., a litter box is disclosed that has a false bottom with a slidable tray and a slidable floor. The walls have inserts for the false bottom midway between their ends and inserts at both of their ends for the floor. The false bottom has openings for allowing unsoiled litter to pass therethrough but for retaining soiled litter. A slidable tray is attached to the false bottom slidable between a first position in which the openings in the false bottom are closed and a second position in which the openings in the false bottom are open. In operation, the false bottom with the tray is installed in the walls, litter is placed on one side of the false bottom, and the floor is installed in the wall opposite the tray. When the litter is soiled, the tray is slid into the second position so that unsoiled litter falls through the openings to the floor. The tray is then slid back to the first position and the false bottom is removed from the walls, held over a suitable receptacle, and the soiled litter is properly disposed. The false bottom is then reinserted into the walls in an upside down position, the entire litter box assembly is then turned over so that the litter on the floor falls to the false bottom, and then the floor is removed and reinserted at the opposite ends of the walls. Thus, the litter box assembly returns to its original condition ready for use with filtered, unsoiled litter.

A basic problem with these prior art litter boxes is the degree of complexity in their use. In the litter box disclosed by Carlson, for example, one must gingerly remove the false bottom to retain as much soiled litter as possible. The false bottom must also be removed completely from the litter box assembly and then replaced. In Burniski, the false bottom must be removed and disposed over a receptacle for dumping of the soiled litter, the floor taken out and reinserted to meet the new orientation, and the litter box assembly must be physically turned over. In sum, then, there is a need for an improved litter box assembly that requires less components, less steps in cleaning the litter, and is simply less complex.

The present invention achieves these goals by incorporating two boxes into the new litter box assembly with each box comprising only two components that remain in slidable engagement with one another during operation and use of the litter box assembly. Furthermore, in cleaning the litter box assembly, the upper box is shaken over a receptacle to dispose of soiled litter, then placed on the ground and the other litter box is then placed inside of it, with no need for flipping over the litter box assembly or removing and reinserting a floor. No litter box assembly disclosed or suggested in the prior art achieves the degree of simplicity and ease of use as the litter box assembly of the present invention.

SUMMARY OF THE INVENTION

Briefly summarized, the present invention relates to a litter box assembly comprising a first litter box for containing litter having side walls and end walls integral with a floor that defines multiple openings in the floor. A second litter box also comprises side walls and end walls and a floor, with the first box being nested in the second box when in operation to define a litter receiving space between the floors for receiving unsoiled litter.

The first box has a filtering means disposed between the floors and slidably attached to the floor of the first box, the filtering means preferably being in the form of a slide plate slidable between a first position in which the openings in the first floor are closed from the litter receiving space and a second position in which the openings in the floor are open to the litter receiving space to allow unsoiled litter to pass therethrough, while preventing soiled, clumped litter from passing therethrough.

In a further feature of the present invention, the first box and the second box have engaging portions integral with their side walls and end walls for supporting the first box when nested in the second box to define the litter receiving space. The second box may also be equipped with an end wall defining a ledge upon which the first box is supported when the first box is nested within the second box. Preferably, the first box and the second box are identical and interchangeable so as to be reversibly nestable.

In one embodiment of the present invention, the filtering means includes an actuating handle. End walls of the first and the second boxes define an opening through which the actuating handle of the first box extends when the boxes are nested, with the actuating handle being slidable between first and second positions corresponding to the first and the second positions of the filtering means. The actuating handle is also selectively slidable to a third position intermediate the first and the second positions in which the openings in the floor of the first box are partially opened to the litter receiving space.

The litter box assembly of the present invention thus facilitates a novel method of removing soiled, clumped litter by the steps of: (1) nesting a first litter box in a second litter box to define a space between the respective floors for receiving unsoiled litter; (2) filtering litter from the first box into the second box by (a) first displacing a slidable plate from its first position in which the openings are closed to the litter receiving space, to its second position in which the openings are open to the litter receiving space, and (b) then displacing the slidable plate back to the first position, and (3) nesting the second box having unsoiled litter in the first box.

DETAILED DESCRIPTION OF THE PREFERRED EMBODIMENT

Figure 1:
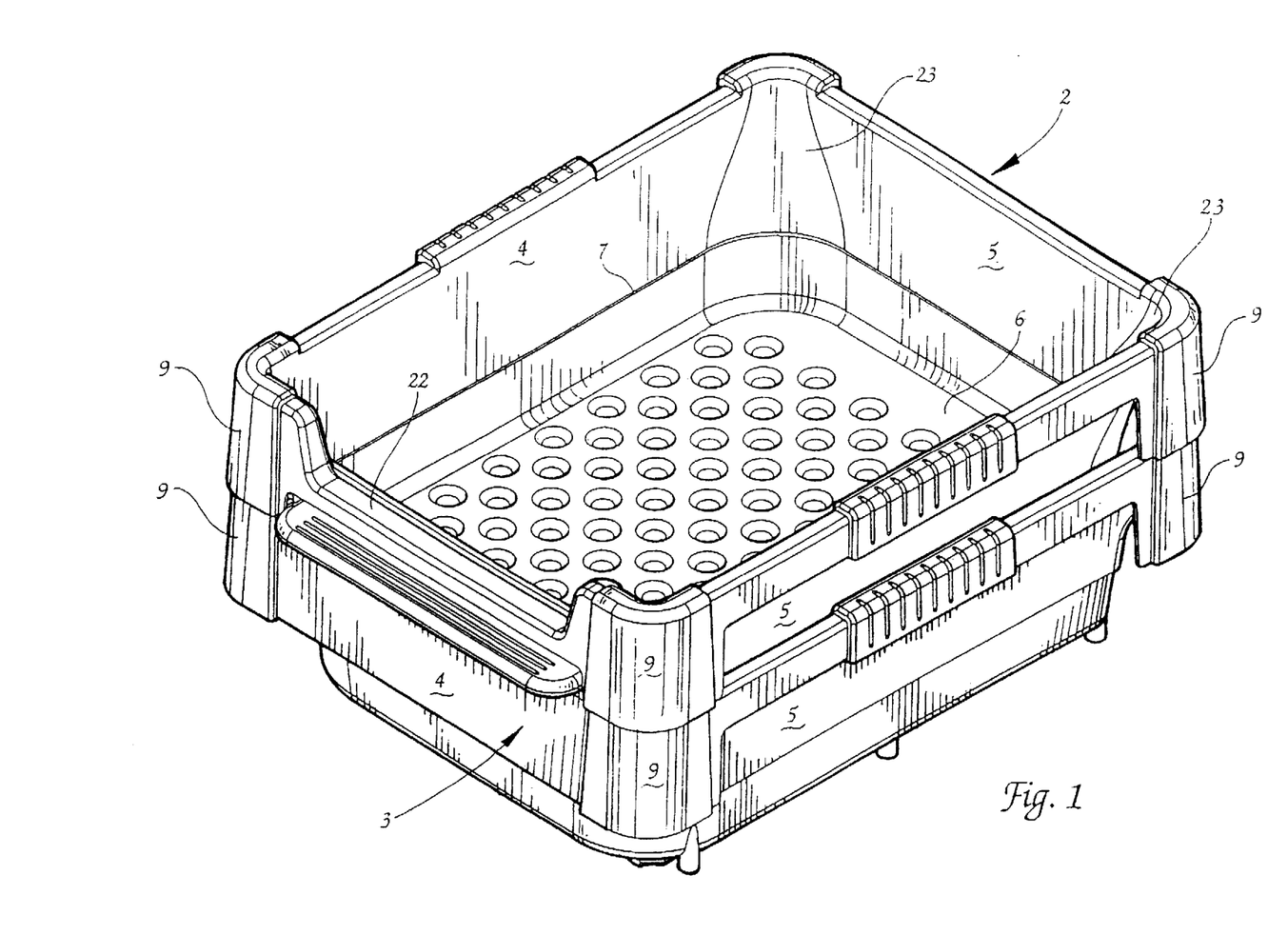
FIG. 1 is a perspective view of the preferred embodiment of the litter box assembly of the present invention.
Figure 2:
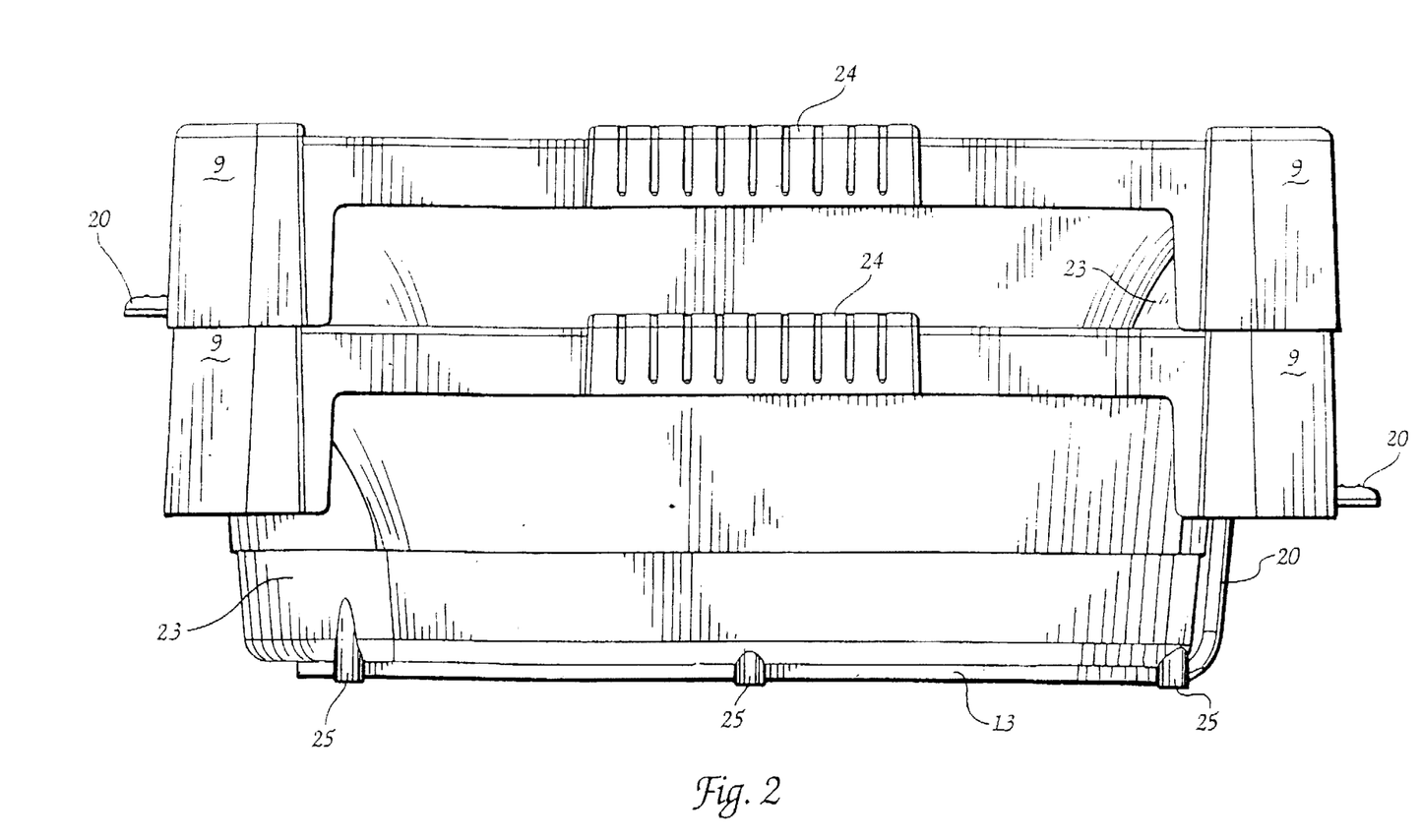
FIG. 2 is a side elevational view of the litter box assembly of FIG. 1.

Referring to the drawings and initially to FIG. 1, the preferred embodiment of the litter box assembly of the present invention basically comprises two identical litter boxes 2,3 which are reversibly nestable (as more fully explained below) with one another, e.g., as depicted in FIG. 1, with the first litter box 2 employed as the upper litter box, and the second litter box 3 employed as the bottom litter box supporting the first litter box 2. Because litter box 2 is identical to litter box 3, like reference numerals are used to identify corresponding components of the two litter boxes 2,3.

Each litter box 2,3 is preferably molded out of a rugged plastic material in a rectangular shape with side walls 4 and end walls 5 integral with a floor 6. The side walls 4 and the end walls 5 further define a ridge 7 extending continuously about the periphery of the walls 4,5 for marking the recommended height of litter to be poured into a litter box. The top of walls 4 and end walls 5 form an inverted U-shaped lip 8 (see FIG. 5), which is enlarged and extended outwardly of the intersections of side walls 4 and end walls 5 to form inverted cup-shaped engaging portions 9 (see FIG. 6). Each litter box 2,3 further has foot portions 25 for resting of the litter box 2,3 on the ground. When litter box 2 is nested in litter box 3, the engaging portions 9 of the bottom litter box 3 engage and support the engaging portions 9 of the upper litter box 2, thereby in effect serving as support pillars to maintain a litter receiving space 11 between the floors 6 of the two boxes 2,3.

Figure 5:
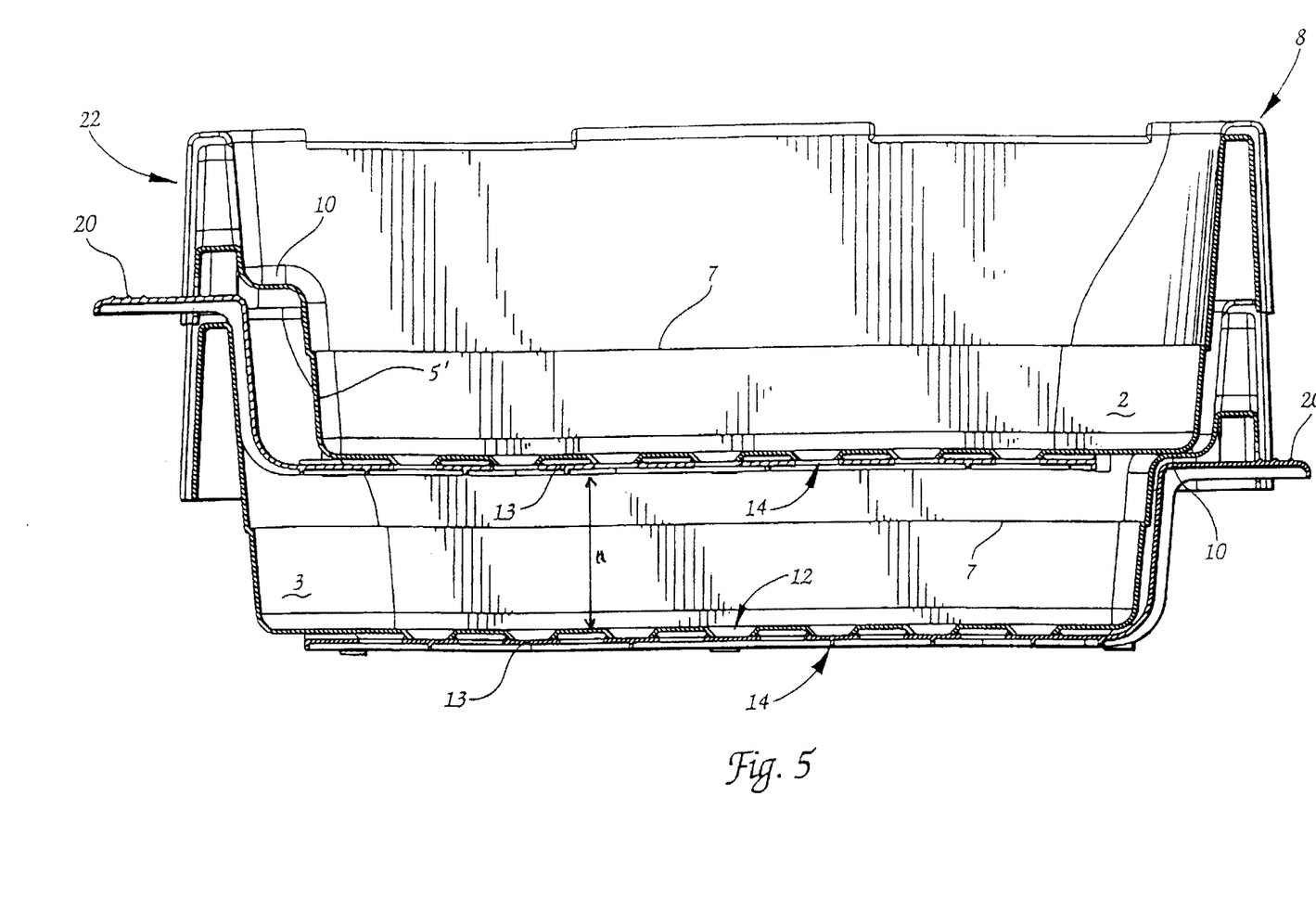
FIG. 5 is a vertical cross-sectional view of the litter assembly taken along the lines 5—5 of FIG. 4.

As best seen in FIG. 5, one end wall 5' of each litter box 2,3 is formed in a stepped configuration defining a horizontal ledge 10 that additionally supports the other litter box when nested therein. Thus, the engaging portions 9 and ledge 10 of the lower box 3 cooperate to support the nesting of the upper litter box 2 in the litter box 3. Preferably, the engaging portions 9 and the ledge 10 are dimensional to define a sufficient litter receiving space 11 between the floors 6 of the litter boxes 2,3 that the floor 6 of the upper box 2 is elevated above the ridge 7 of the lower box 3 so as not to interfere with the ability of the lower box 3 to hold a full quantity of litter up to its ridge 7.

Figure 3:
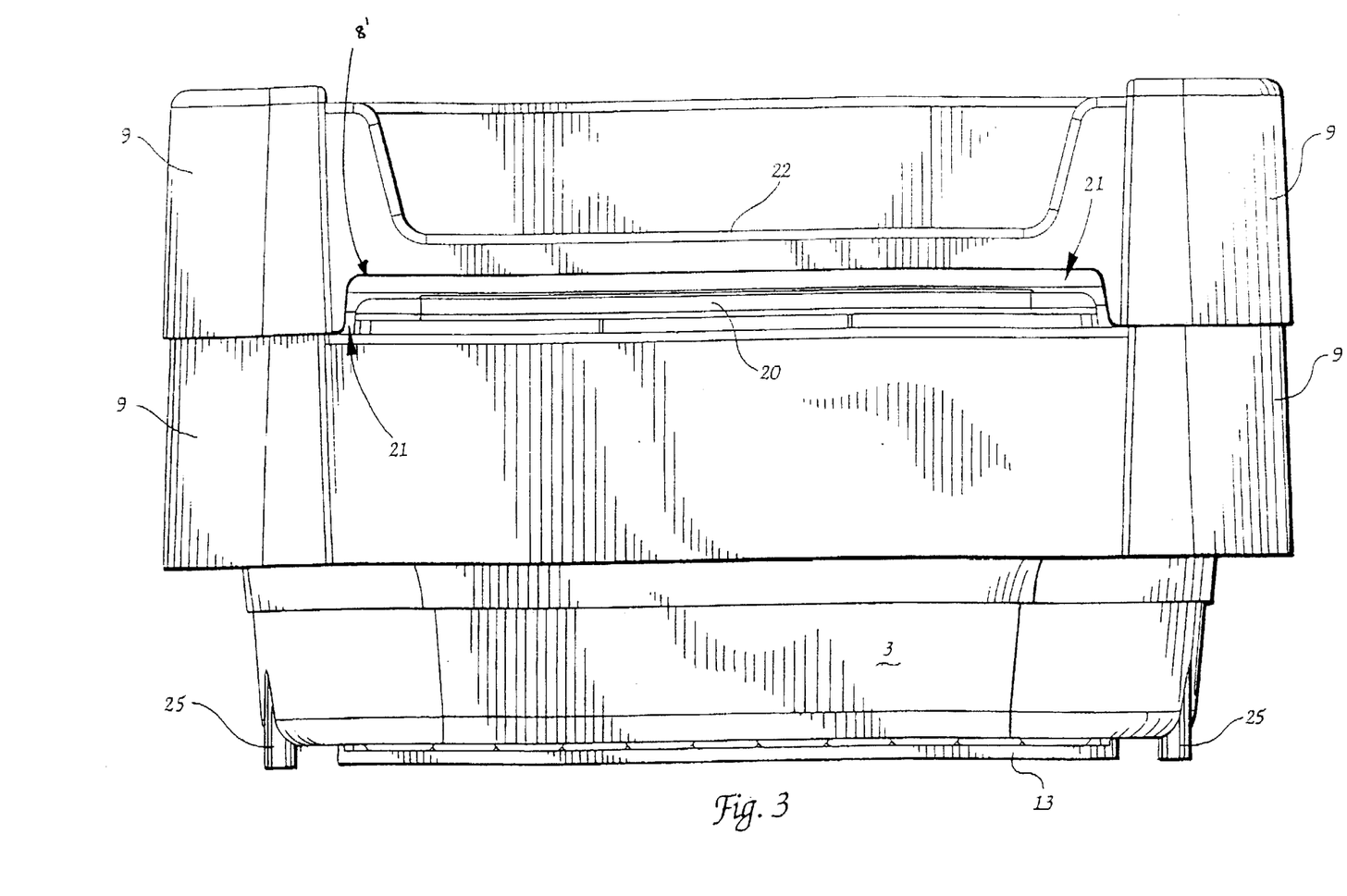
FIG. 3 is front elevational view of the litter box assembly of FIG. 1.

The upper extent of the end wall 5' of each box 2,3 is lowered in comparison to the height of the side walls 4 and the opposite end wall 5 to define an entrance area 22 between the laterally adjacent engaging portions 9 to permit easier access into the litter box by a pet. The lowered edge of the lip portion 8' (as seen in FIG. 3) at the end wall 5' is raised slightly from the lower edge of the adjacent engaging portions 9 to define a slot-like access opening 21 between the lip portion 8' and the lip portion 8 of the other end wall 5 of the other box when nested together, as more fully explained hereinafter.

Figure 4:
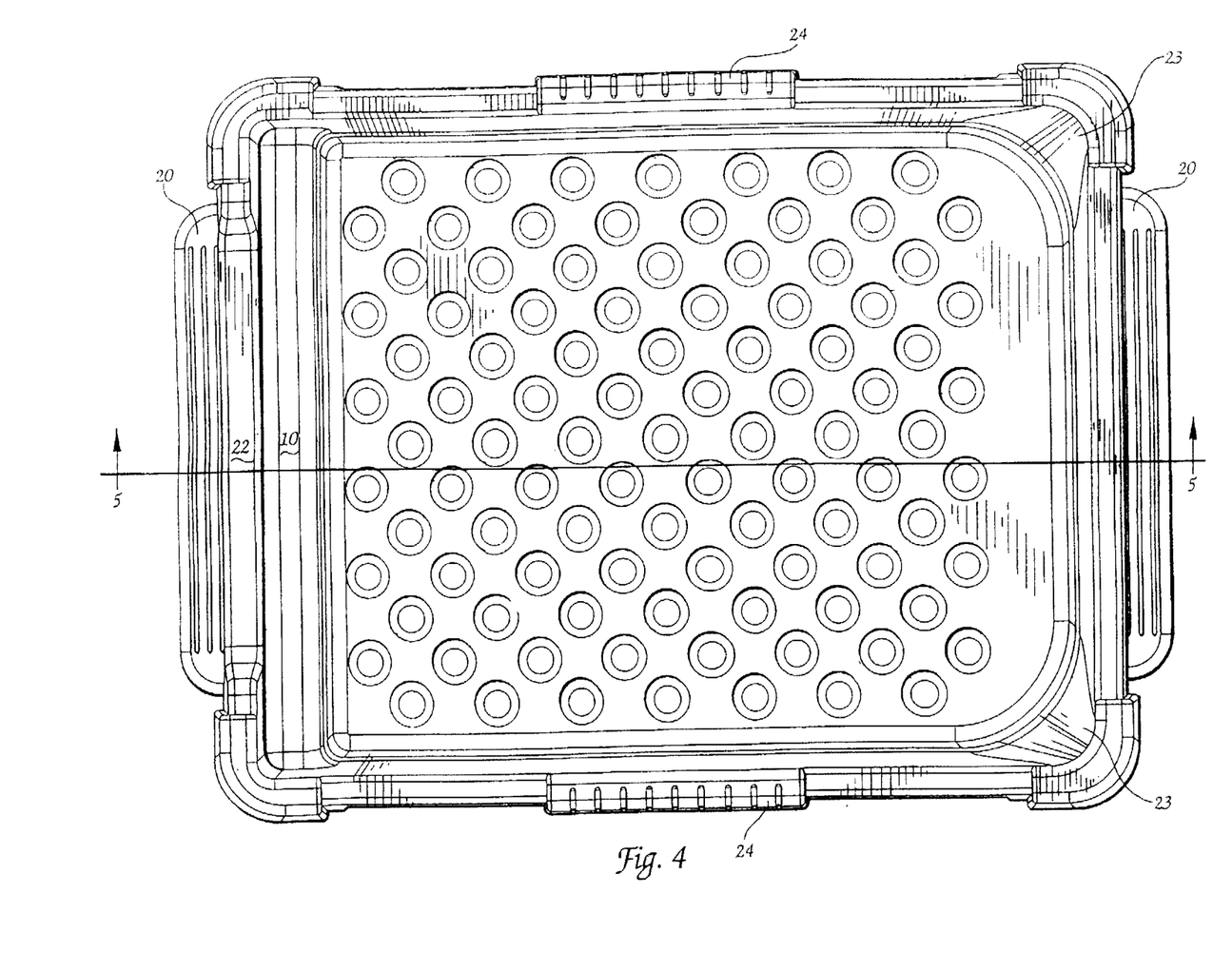
FIG. 4 is a top plan view of the litter box assembly of FIG. 1.

The floor 6 of each litter box 2,3 defines a plurality of regularly spaced openings 12 therein. Preferably the openings 12 are circularly funnel-shaped, with the sides of the funnel being slanted at an angle (e.g., about 45 degrees) and having rounded edges to facilitate litter filtration flow through the openings 12. The center diameter of openings 12 and their relative spacing from one another should be sufficient to permit free and quick flow of unsoiled litter through the openings without permitting soiled litter clumps and pet waste to pass through the openings 12. For example, an opening diameter of about five-eighths of an inch and an arrangement of the openings 12 in a pattern of linear rows diagonally to the side and end walls 4,5 with the openings spaced approximately eighty-eight one hundredths of an inch from each other, as shown in FIG. 4, has been found to be effective and suitable.

Figure 6:
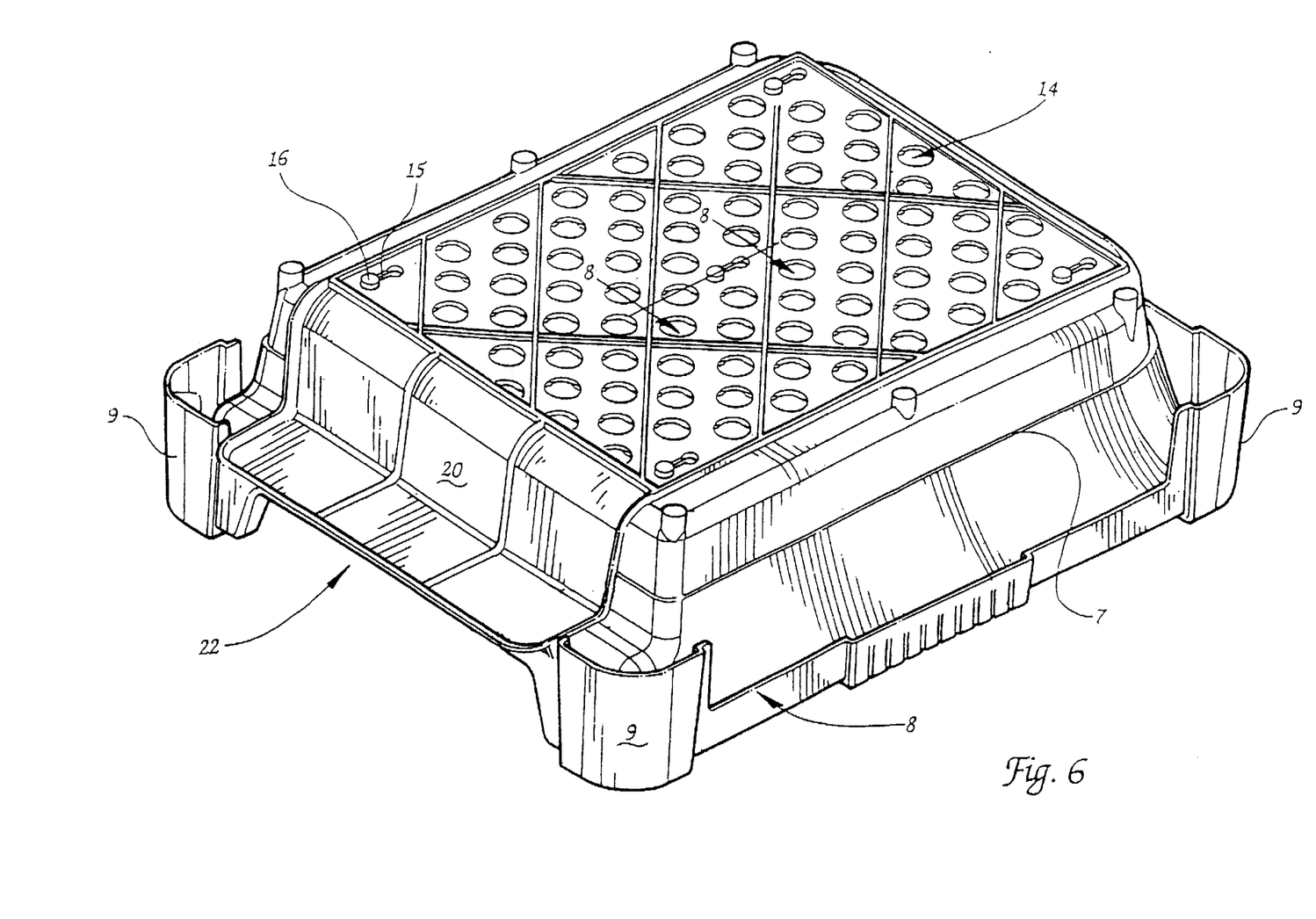
FIG. 6 is a perspective view of one of the litter boxes of the litter box assembly of FIG. 1 in an upsidedown disposition.
Figure 7:
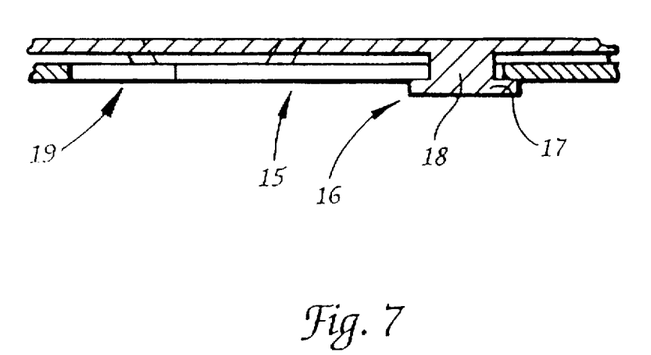
FIG. 7 is a vertical cross-sectional view of the litter box of FIG. 6 taken along line 8—8 thereof.

A rectangular plate 13 is slidably attached to the underside of the floor 6 of each box 2,3 and extends substantially the length of the floor 6. Like floor 6, the plate 13 defines plural openings 14 having a similar diameter and formed at the same regular spacing and arrangement as the openings 12 in the floor 6 of the associated box 2,3. Plate 13 is disposed tightly against floor 6 and is held in place by means of a plurality of cylindrical retaining pins 16 formed integrally with floor 6 through a respective plurality of identically arranged slots 15 formed in the plate 13. Each pin 16 has a head 17 of larger diameter than its base portion 18 and each slot 15 has a width greater than the base portion 18 but less than the head 17 of the pin 16, thereby retaining the plate 13 against the underside of the floor 6. At one end of each slot 15, a circular opening 19 is provided in plate 13 with a diameter greater than that of the head pin 17, thus enabling the plate 13 to be selectively attached and detached to and from the floor 6 by positioning the head 17 of each pin 16 at the opening 19 of each slot 15. Preferably, five pairs of slots 15 and pins 16 secure the plate 13 to the floor 6, with a slot and pin combination located adjacent each of the four corners and the center of the plate 13, as shown in FIG. 6.

As will be understood, the length of the slots 15 defines a permissible range of sliding movement of the plate 13 relative to the floor 6 of the associated box 2,3, which should be sufficient to permit full opening and closing of the floor openings 12. Specifically, when plate 13 is in a first position, wherein the pins are disposed in a corresponding first position at the end of the slots 15 opposite the openings 19, as shown by the plate 13 of the lower box 3 in FIG. 5, the openings 14 in the plate 13 do not correspond with the openings 12 in the floor 6 and the plate 13 therefore prevents litter from falling through the openings 12 in the floor 6. When the plate 13 is moved to a second position, however, as shown by the plate 13 of the upper litter box 2 in FIG. 5, the openings 14 correspond exactly with the openings 12 in the floor 6 and, therefore, any litter in the litter box 2 that is unsoiled and therefore unclumped filters through the aligned openings 12,14 into the space 11 between the two nested boxes 2,3. As discussed above, to facilitate filtering of the litter box 2 when plate 13 is in the second position, each opening 12 in the floor 6 is funnel-shaped.

One end of each plate 13 is configured in an inverted L-shape to form an integral actuating handle 20 of the litter box 2 for manually sliding the plate 13 between the first position and second position. As seen in FIG. 5, the L-shaped handle 20 is positioned at and generally conforms to the configuration of the stepped ledge 10 of the litter box 2 to be exposed and accessible immediately below the lowered entrance area 22 of the litter box 2 and to project outwardly through the opening 21 defined between the boxes 2,3 when nested. The actuating handle 20 of the upper litter box 2 may therefore be manually moved between the first and second positions when litter boxes 2,3 are nested. Specifically, the actuating handle 20 extends slightly outward from underneath the entrance 22 when the plate 13 is in the first position and the actuating handle 20 is pulled further outward from entrance 22 when plate 13 is moved into the second position.

As mentioned above, boxes 2,3 are identical and therefore interchangeable. However, due to the space required for the plate 13 and the actuating handle 20 to slide within the lower litter box 3 when the upper litter box 2 is nested therein, this space being substantially defined by the horizontal width of the ledge 10 as shown in FIG. 5, litter boxes 2,3 must reversibly nest in operation. In fact, litter boxes 2,3 will not properly nest without reversing with respect to one another.

The operation of the litter box assembly 1 may thus be understood. In using the preferred litter box assembly of the present invention, clean litter is poured into the upper litter box 2 nested in the lower litter box 3, preferably until the litter reaches the ridge 7. Clumpable litter is recommended and preferred in practicing the present invention, but any type of litter should perform satisfactorily.

When the litter box assembly has been used by a pet and the litter needs to be cleaned, the actuating handle 20 of the upper litter box 2 is manually slid from the first position to the second position, thereby causing the plate 13 to move from the first (closed) position to the second (open) position and causing the openings 14 in the plate 13 to register with the openings 12 in the floor 6, as shown in FIG. 5. This immediately causes unsoiled and unclumped litter to fall through the registered openings 12,14 in a matter of seconds and soiled, clumped litter to remain on the floor 6. Slight shaking or vibrating of the litter box 2 may be required to empty the litter box 2 of all clean, unclumped litter; however, in practice, substantially all of the clean, unclumped litter passes through the openings 12,14 upon sliding the plate 13 into the second position. Of course, sliding plate 13 from the first position to a third intermediate position between the first and second positions will partially unblock the openings 12 in the floor 6 and allow unclumped litter to fall therethrough to the litter receiving space 11 at a slower rate than if plate 13 were slid fully into the second position. In any event, when the unclumped litter has passed through the openings 12,14, the plate 13 is returned to the first (closed) position.

The next step in cleaning the litter is to lift the upper litter box 2 out of the lower litter box 3 and transport the soiled, clumped litter therein to a suitable receptacle for disposal of the soiled, clumped litter. The litter boxes 2,3 are provided with gripping portions 24 for lifting. The litter box can be angled so that the clumped litter spills out of box 2 along one of the pouring corners 23 formed at the intersection of the side walls 4 and end walls 5, as shown in FIG. 1.

When the clumped, soiled litter has been dumped, litter box 3 containing the filtered, clean litter is reversibly nested in the emptied litter box 2 to become the new upper litter box. If desired, new litter may also be added to the litter box 3 bringing the litter back to the ridge 7. In any event, the litter box assembly has thus been cleaned and is ready for new use.

The advantages of the present invention are thus evident and numerous over the prior art. First, the invention exhibits great simplicity. It comprises only a pair of boxes, each having two components in slidable attachment with one another. Furthermore, the boxes are identical and interchangeable. Second, the invention is very easy to use. In practice, the plate needs only to be slid to the second position from the first position; the soiled, clumped litter appears almost immediately, and the clean, unsoiled litter filters to the bottom litter box. The combined steps of practicing the invention—sliding the plate from the first position to the second position and back again, picking the upper box up, dumping its contents into a trash can, setting it back down, and setting the previously bottom box now containing the filtered litter into the previous upper box—could not be simpler without dumping both the soiled and unsoiled litter.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

We claim:

1. A litter box assembly, comprising:
    a first box for containing litter comprising side and end walls and a floor defining multiple openings in said floor,
    a second box for containing litter comprising side and end walls and a floor, said first box being nested in said second box to define a litter receiving space between said floors for receiving unsoiled litter, said floor of said first box being disposed within a space defined by said side and end walls of said second box,
    said first box further comprising a filtering plate attached to said floor of said first box slidable between a first position in which said openings in said first floor are closed from said litter receiving space and a second position in which said openings in said first floor are open to said litter receiving space to allow unsoiled litter to pass therethrough while preventing soiled, clumped litter from passing therethrough, said filtering plate further including an actuating handle and said end walls of said first and said second boxes defining an opening through which said actuating handle extends when said first box is nested in said second box, said actuating handle being slidable between first and second positions corresponding to said first and said second positions of said filtering plate when extending through said opening.

2. A litter box assembly according to claim 1, wherein one of said end walls of said first box defines a ledge providing sufficient space beneath said first box for said sliding of said actuating handle and said filtering plate when said first box is nested in said second box.

3. A litter box assembly according to claim 2, wherein said actuating handle is an inverted L-shape and generally conforms to a configuration of said ledge.

4. A litter box assembly according to claim 3, wherein said first box and said second box are identical and interchangeable.

5. A litter box assembly according to claim 4, wherein said first box and said second box are reversibly nestable.

6. A litter box assembly according to claim 1, wherein said first box and said second box have engaging portions integral with said side and end walls for supporting said first box nested in said second box to define said litter receiving space.

7. A litter box assembly according to claim 6, wherein said first box and said second box are identical and interchangeable.

8. A litter box assembly according to claim 7, wherein said first box and said second box are reversibly nestable.

9. A litter box assembly according to claim 1, wherein said filtering plate and said handle are slidable to a third position intermediate said first and said second positions in which said openings in said floor of said first box are partially opened to said litter receiving space.

10. A litter box assembly according to claim 9, wherein said first box is identical and interchangeable with said second box.

11. A litter box assembly according to claim 10, wherein said first box and said second box are reversibly nestable.

12. A litter box assembly, comprising:

a first box for containing litter comprising side and end walls and a floor defining multiple openings in said floor, a second box for containing litter comprising side and end walls and a floor, said first box being nested in said second box to define a litter receiving space between said floors for receiving unsoiled litter, said floor of said first box being disposed within a space defined by said side and end walls of said second box, said first box further comprising a filtering plate attached to said floor of said first box slidable between a first position in which said openings in said first floor are closed from said litter receiving space and a second position in which said openings in said first floor are open to said litter receiving space to allow unsoiled litter to pass therethrough while preventing soiled, clumped litter from passing therethrough, said filtering plate further including an actuating handle and one of said end walls of said first box defining a ledge providing sufficient space beneath said first box for said sliding of said actuating handle and said filtering plate when said first box is nested in said second box.

13. A litter box assembly according to claim 12, wherein said actuating handle is an inverted L-shape and generally conforms to a configuration of said ledge.

14. A litter box assembly according to claim 13, wherein said first box and said second box are identical and interchangeable.

15. A litter box assembly according to claim 14, wherein said first box and said second box are reversibly nestable.

16. A litter box assembly according to claim 12, wherein said first box and said second box have engaging portions integral with said side and end walls for supporting said first box nested in said second box to define said litter receiving space.

17. A litter box assembly according to claim 16, wherein said first box and said second box are identical and interchangeable.

18. A litter box assembly according to claim 17, wherein said first box and said second box are reversibly nestable.

19. A litter box assembly according to claim 12, wherein said filtering plate and said handle are slidable to a third position intermediate said first and said second positions in which said openings in said floor of said first box are partially opened to said litter receiving space.

20. A litter box assembly according to claim 19, wherein said first box is identical and interchangeable with said second box and wherein said first box and said second box are reversibly nestable.

* * * * *